United States Patent
Murata et al.

(10) Patent No.: US 9,793,059 B2
(45) Date of Patent: Oct. 17, 2017

(54) ELECTROLYTIC SOLUTION FOR ALUMINUM ELECTROLYTIC CAPACITOR AND ALUMINUM ELECTROLYTIC CAPACITOR USING THE SAME

(71) Applicant: SANYO CHEMICAL INDUSTRIES, LTD., Kyoto (JP)

(72) Inventors: Shinichi Murata, Kyoto (JP); Hideo Seike, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 172 days.

(21) Appl. No.: 14/774,697

(22) PCT Filed: Mar. 3, 2014

(86) PCT No.: PCT/JP2014/001141
§ 371 (c)(1),
(2) Date: Sep. 10, 2015

(87) PCT Pub. No.: WO2014/141620
PCT Pub. Date: Sep. 18, 2014

(65) Prior Publication Data
US 2016/0020036 A1    Jan. 21, 2016

(30) Foreign Application Priority Data
Mar. 12, 2013    (JP) .................. 2013-048598

(51) Int. Cl.
*H01G 9/035*    (2006.01)
*H01G 9/10*    (2006.01)
*H01G 9/145*    (2006.01)

(52) U.S. Cl.
CPC .............. *H01G 9/10* (2013.01); *H01G 9/035* (2013.01); *H01G 9/145* (2013.01)

(58) Field of Classification Search
CPC .......... H01G 9/10; H01G 9/035; H01G 9/145
See application file for complete search history.

(56) References Cited

U.S. PATENT DOCUMENTS 8,163,195 B2 *    4/2012    Oka .................. H01G 9/038
                                                          252/62.2

FOREIGN PATENT DOCUMENTS

| CN | 1708817 | 12/2005 |
|---|---|---|
| CN | 1829828 | 9/2006 |
| EP | 2323144 | 5/2011 |
| JP | S53-12073 | 2/1978 |
| JP | H4-49771 | 8/1992 |
| JP | H11322720 | 11/1999 |
| JP | 2000-156330 | 6/2000 |
| JP | 2001220373 | 8/2001 |
| JP | 2004155729 | 6/2004 |
| JP | 2004165187 | 6/2004 |
| JP | 2011-91428 | 5/2011 |
| JP | 2011-211146 | 10/2011 |
| WO | 95/15572 | 6/1995 |
| WO | 2014156105 | 10/2014 |

OTHER PUBLICATIONS

"International Search Report (Form PCT/ISA/210)", dated Apr. 1, 2014, with English translation thereof, pp. 1-4, in which four of the listed references (JP2011-91428A, JP2011-211146A, JP2000-156330A and JPS53-12073A) were cited.
"Written Opinion of the International Searching Authority" of PCT/JP2014/001141, dated Apr. 1, 2014, with English translation thereof, p. 1-p. 11.
"Search Report of European Counterpart Application", dated Nov. 4, 2016, p. 1-p. 7.
"Office Action of China Counterpart Application," with English translation thereof, dated Apr. 12, 2017, p. 1-p. 14.

* cited by examiner

Primary Examiner — Carol M Koslow
(74) Attorney, Agent, or Firm — Jianq Chyun IP Office

(57) ABSTRACT

An issue of this invention is to enhance reliability of an electrolytic capacitor in a manner that an electrolytic solution does not leak from a sealed part while a high initial electrical conductivity is maintained even at a higher environment temperature or in a high-humidity condition. An electrolytic solution for aluminum electrolytic capacitor is described, containing a solvent (A) and an electrolyte (D) represented by general formula (1) below. In formula (1), $R^1$ to $R^3$ each represent alkyl having 1 to 3 carbon atoms, $R^4$ to $R^7$ each represent alkyl having 1 to 3 carbon atoms or a hydrogen atom, and $X^-$ represents an anion of an acid (C).

8 Claims, No Drawings

ELECTROLYTIC SOLUTION FOR ALUMINUM ELECTROLYTIC CAPACITOR AND ALUMINUM ELECTROLYTIC CAPACITOR USING THE SAME

CROSS-REFERENCE TO RELATED APPLICATION

This application is a 371 of international application of PCT application serial no. PCT/JP2014/001141 filed on Mar. 3, 2014, which claims the priority benefit of Japan application no. 2013-048598 filed on Mar. 12, 2013. The entirety of each of the above-mentioned patent applications is hereby incorporated by reference herein and made a part of this specification.

Examples of the anion ($D_A$) include an anion of the acid (C).

Examples of the acid (C) include various organic acids and/or inorganic acids commonly used in electrolytic solutions.

The organic acid and inorganic acid are exemplified by the following items 1) to 6).

1) Carboxylic Acids
   C2-15 polycarboxylic acid having a valence of 2 to 4: examples thereof include: aliphatic polycarboxylic acids, such as saturated polycarboxylic acids (such as oxalic acid, malonic acid, succinic acid, glutaric acid, adipic acid, pimelic acid, suberic acid, azelaic acid, and sebacic acid, etc.), and unsaturated polycarboxylic acids (such as maleic acid, fumaric acid, and itaconic acid, etc.); aromatic polycarboxylic acids, such as phthalic acid, isophthalic acid, terephthalic acid, trimellitic acid, and pyromellitic acid, etc.; and S-containing polycarboxylic acids, such as thiodipropionic acid, etc.
   C2-20 hydroxycarboxylic acid: examples thereof include: aliphatic hydroxycarboxylic acids, such as glycolic acid, lactic acid, tartaric acid, and castor oil fatty acid, etc.; and aromatic hydroxycarboxylic acid, such as salicylic acid, and mandelic acid, etc.
   C1-30 monocarboxylic acid: examples thereof include: aliphatic monocarboxylic acids, such as saturated monocarboxylic acids (such as formic acid, acetic acid, propionic acid, butyric acid, isobutyric acid, valeric acid, caproic acid, enanthic acid, caprylic acid, pelargonic acid, lauric acid, myristic acid, stearic acid and behenic acid, etc.), and unsaturated monocarboxylic acids (such as acrylic acid, methacrylic acid, crotonic acid and oleic acid, etc.); and aromatic monocarboxylic acids, such as benzoic acid, cinnamic acid, and naphthoic acid, etc.

FIELD OF THE INVENTION

The invention relates to an electrolytic solution for an aluminum electrolytic capacitor, and an aluminum electrolytic capacitor using the same.

DESCRIPTION OF THE RELATED ART

Recently, aluminum electrolytic capacitors for use in automotive electrical equipment are desired to exhibit little degradation in characteristics at high temperature as the temperature of the environment gets higher, and are desired to exhibit little degradation in the characteristics even in a high-humidity condition due to their exposure in the open air. Hence, the electrolytic solutions are also desired to exhibit little degradation in characteristics in a high-temperature and high-humidity environment.

Conventionally, an electrolytic solution including a carboxylate salt of a quaternized product of a compound containing an alkyl-substituted amidine group as an electrolyte, namely an amidine-based electrolytic solution (see Patent Document 1, for example), or the like is known as an electrolytic solution for an aluminum electrolytic capacitor with high durability.

PRIOR-ART DOCUMENTS

Patent Document

Patent Document 1: International Patent Publication No. WO 95/15572.

SUMMARY OF THE INVENTION

Problems to be Solved

Prior to the amidine-based electrolytic solution, the quaternary alkylammonium-based electrolytic solution has been used. However, a defect thereof is leakage from a sealed part that has deteriorated due to alkali. On the other hand, the amidine-based electrolytic solution of Patent Document 1 reacts with an alkali formed by the compound having the alkyl-substituted amidine group. Hence, deterioration of a sealing member caused by alkali is suppressed, and the electrolytic solution is prevented from leaking from the sealed part. In this way, with the effect not made by a quaternary alkylammonium-based electrolytic solution, the amidine-based electrolytic solution is widely used as an electrolytic solution for aluminum electrolytic capacitors. Nevertheless, at a higher temperature of the environment or in a high-humidity condition, the efficiency of suppression of alkali-caused deterioration is not always sufficient.

An issue of the invention is to enhance reliability of an electrolytic capacitor in a manner that the electrolytic solution does not leak from a sealed part while high initial electrical conductivity is kept even at a higher environment temperature or in a high-humidity condition.

Means for Solving the Problems

As a result of investigation for achieving the above object, the present inventors have attained the invention.

Namely, the invention relates to an electrolytic solution for an aluminum electrolytic capacitor, containing a solvent (A) and an electrolyte (D) represented by general formula (1) below, wherein the total content of a compound (E1) represented by general formula (2) below, a compound (E2) represented by general formula (3) below and a compound (E3) represented by general formula (4) below is not more than 3 wt % relative to the total weight of (A) and (D). The invention also relates to an aluminum electrolytic capacitor comprising the electrolytic solution.

(1)

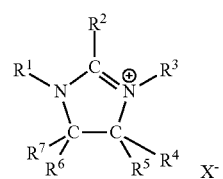

In formula (1), $R^1$ to $R^3$ each represent alkyl having 1 to 3 carbon atoms, $R^4$ to $R^7$ each represent alkyl having 1 to 3 carbon atoms or a hydrogen atom, and $X^-$ represents an anion of an acid (C).

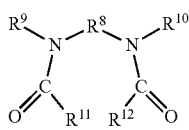
(2)

In formula (2), $R^8$ is alkylene having 1 to 3 carbon atoms, $R^9$ to $R^{12}$ are each alkyl having 1 to 3 carbon atoms or a hydrogen atom, and $R^{11}$ and $R^{12}$ may be covalently bonded to form a ring.

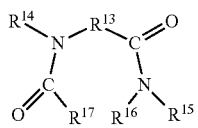
(3)

In formula (3), $R^{13}$ is alkylene having 1 to 3 carbon atoms, $R^{14}$ to $R^{17}$ are each alkyl having 1 to 3 carbon atoms or a hydrogen atom, and $R^{16}$ and $R^{17}$ may be covalently bonded to form a ring.

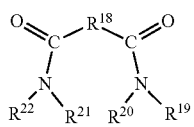
(4)

In formula (4), $R^{18}$ is alkylene having 1 to 3 carbon atoms, $R^{19}$ to $R^{22}$ are each alkyl having 1 to 3 carbon atoms or a hydrogen atom, and $R^{20}$ and $R^{21}$ may be covalently bonded to form a ring.

An electrolytic capacitor comprising the electrolytic solution of the invention can be made a highly reliable capacitor free from leakage of electrolytic solution through a sealed part while maintaining high initial electrical conductivity even at a higher temperature of the environment or in a high-humidity condition.

DESCRIPTION OF THE EMBODIMENTS

In the electrolytic solution of the invention, when a voltage is applied thereto, $OH^-$ is generated at a cathode side and $H^+$ generated at an anode side as a result of electrolysis of water contained in the electrolytic solution. $H^+$ reacts with the compound (E) to form an ammonium cation. The ammonium cation neutralizes $OH^-$ and is thus considered to exhibit an effect of suppressing alkali. Hence, even if the capacitor is used at high temperature and high humidity, due to the effect of the compound (E), deterioration of a sealing member caused by alkali is difficult to occur, and leakage of the electrolytic solution from a sealed part can be suppressed. When a compound (B) having a cation component represented by the above general formula (1) being a quaternized product of a compound containing an alkyl-substituted amidine group is combined with the compound (E), an electrolytic solution for capacitor having high reliability even at high temperature and high humidity is produced.

<Solvent (A)>

The solvent (A) that constitutes the electrolytic solution of the invention is preferably a polar solvent, and more preferably a polar solvent (A1) having dielectric constant of 5 to 150 at 25° C. Among (A1), an aprotic solvent (A11) is even more preferred.

Examples of the solvent (A) include: 1) an alcohol, 2) an ether, 3) an amide, 4) an oxazolidinone, 5) a lactone, 6) a nitrile, 7) a carbonate, 8) a sulfone, and 9) other organic solvents.

1) Alcohol

Examples thereof includes: monohydric alcohols, such as methyl alcohol, ethyl alcohol, propyl alcohol, butyl alcohol, diacetone alcohol, benzyl alcohol, amino alcohol, and furfuryl alcohol, etc.; dihydric alcohols, such as ethylene glycol, propylene glycol, diethylene glycol, and hexylene glycol, etc.; trihydric alcohols, such as glycerol, etc.; and tetra- or higher valent alcohols, such as hexitol, etc.

2) Ether

Examples thereof include: monoethers, such as ethylene glycol monomethyl ether, ethylene glycol monoethyl ether, ethylene glycol monobutyl ether, ethylene glycol monophenyl ether, tetrahydrofuran, and 3-methyltetrahydrofuran, etc.; diethers, such as ethylene glycol dimethyl ether, ethylene glycol diethyl ether, diethylene glycol monomethyl ether, and diethylene glycol monoethyl ether, etc.; and triethers, such as diethylene glycol dimethyl ether, and diethylene glycol diethyl ether, etc.

3) Amide

Examples thereof include: formamides, such as N-methylformamide, N,N-dimethyl-formamide, N-ethylformamide, and N,N-diethylformamide, etc.; acetamides, such as N-methylacetamide, N,N-dimethylacetamide, N-ethylacetamide, and N,N-diethylacetamide, etc.; propionamides, such as N,N-dimethylpropionamide, etc.; pyrrolidones, such as N-methylpyrrolidone, and N-ethylpyrrolidone, etc.; and hexamethyl phosphoryl amide, etc.

4) Oxazolidinone

Examples thereof include N-methyl-2-oxazolidinone, 3,5-dimethyl-2-oxazolidinone, etc.

5) Lactone

Examples thereof include: γ-butyrolactone, α-acetyl-γ-butyrolactone, β-butyrolactone, γ-valerolactone, and δ-valerolactone, etc.

6) Nitrile

Examples thereof include: acetonitrile, propionitrile, butyronitrile, acrylonitrile, methacrylonitrile, and benzonitrile, etc.

7) Carbonate

Examples thereof include: ethylene carbonate, propylene carbonate, butylene carbonate, dimethyl carbonate, and diethyl carbonate, etc.

8) Sulfone

Examples thereof include: sulfolane, and dimethyl sulfone, etc.

9) Other Organic Solvents

Examples thereof include: 1,3-dimethyl-2-imidazolidinone; dimethyl sulfoxide; aromatic solvents, such as toluene and xylene, etc.; and paraffin solvents, such as normal paraffin and isoparaffin, etc.

These solvents (A) may be used alone or in combination of two or more. Among them, alcohol, ether, amide, lactone, nitrile, carbonate and sulfone are preferred, γ-butyrolactone and sulfolane are more preferred, and γ-butyrolactone is particularly preferred.

In addition, the aprotic solvent (A11) and a protic solvent (A2) such as ethylene glycol or the like may also be mixed into the electrolytic solution of the invention. The content of (A2) is 0 to 100 weight percent (hereafter sometimes referred to as wt %) based on the weight of (A11). Examples of (A2) include ethylene glycol, propylene glycol and diethylene glycol, etc.

<Electrolyte (D)>

The electrolyte (D) contained in the electrolytic solution of the invention contains a salt of an imidazolinium cation ($D_C$) represented by the above general formula (1) and an anion ($D_A$).

In general formula (1), $R^1$ to $R^3$ are each alkyl having 1 to 3 carbon atoms, and $R^4$ to $R^7$ are each alkyl having 1 to 3 carbon atoms or a hydrogen atom. Examples of the alkyl having 1 to 3 carbon atoms include: methyl, ethyl, n-propyl and isopropyl.

Specific examples of the imidazolinium cation ($D_C$) include: 1,2,3,4-tetramethylimidazolinium, 1,3,4-trimethyl-2-ethylimidazolinium, 1,3-dimethyl-2,4-diethylimidazolinium, 1,2-dimethyl-3,4-diethylimidazolinium, 1-methyl-2,3,4-triethylimidazolinium, 1,2,3,4-tetraethylimidazolinium, 1,2,3-trimethylimidazolinium, 1,3-dimethyl-2-ethylimidazolinium, 1-ethyl-2,3-dimethylimidazolinium, and 1,2,3-triethylimidazolinium, etc.

Among the above examples, 1,2,3,4-tetramethylimidazolinium and 1-ethyl-2,3-dimethylimidazolinium are preferred in view of electrochemical stability, etc.

Examples of the anion ($D_A$) include an anion of the acid (C).

Examples of the acid (C) include various organic acids and/or inorganic acids commonly used in electrolytic solutions.

The organic acid and inorganic acid are exemplified by the following items 1) to 6).

1) Carboxylic Acids

C2-15 polycarboxylic acid having a valence of 2 to 4: examples thereof include: aliphatic polycarboxylic acids, such as saturated polycarboxylic acids (such as oxalic acid, malonic acid, succinic acid, glutaric acid, adipic acid, pimelic acid, superic acid, azelaic acid, and sebacic acid, etc.), and unsaturated polycarboxylic acids (such as maleic acid, fumaric acid, and itaconic acid, etc.); aromatic polycarboxylic acids, such as phthalic acid, isophthalic acid, terephthalic acid, trimellitic acid, and pyromellitic acid, etc.; and S-containing polycarboxylic acids, such as thiodibropionic acid, etc.

C2-20 hydroxycarboxylic acid: examples thereof include: aliphatic hydroxycarboxylic acids, such as glycolic acid, lactic acid, tartaric acid, and castor oil fatty acid, etc.; and aromatic hydroxycarboxylic acid, such as salicylic acid, and mandelic acid, etc.

C1-30 monocarboxylic acid: examples thereof include: aliphatic monocarboxylic acids, such as saturated monocarboxylic acids (such as formic acid, acetic acid, propionic acid, butyric acid, isobutyric acid, valeric acid, caproic acid, enanthic acid, caprylic acid, pelargonic acid, ularic acid, myristic acid, stearic acid and behenic acid, etc.), and unsaturated monocarboxylic acids (such as acrylic acid, methacrylic acid, crotonic acid and oleic acid, etc.); and aromatic monocarboxylic acids, such as benzoic acid, cinnamic acid, and naphthoic acid, etc.

2) Phenols

Monohydric phenol (including phenols and naphthols): examples thereof include: phenol, alkyl ($C_{1-15}$) phenols (such as cresol, xylenol, ethylphenol, n- or iso-propylphenol, and isododecylphenol, etc.), methoxyphenols (such as eugenol, and guaiacol, etc.), α-naphthol, β-naphthol, and cyclohexylphenol, etc.

Polyhydric phenol: examples thereof include: catechol, resorcin, pyrogallol, phloroglucin, bisphenol A, bisphenol F, and bisphenol S, etc.

3) Mono- and Di-Alkyl Phosphates Containing Alkyl Having 1 to 15 Carbon Atoms

Examples thereof include mono- and di-methyl phosphates, mono- and di-ethyl phosphates, mono- and di-isopropyl phosphates, mono- and di-butyl phosphates, mono- and di-(2-ethylhexyl) phosphates, and mono- and di-isodecyl phosphates, etc.

(4) Sulfonic Acid

Examples thereof include: alkyl ($C_{1-15}$) benzenesulfonic acid (p-toluenesulfonic acid, nonylbenzenesulfonic acid, and dodecylbenzenesulfonic acid, etc.), sulfosalicylic acid, methanesulfonic acid, and trifluoromethanesulfonic acid, etc.

5) Inorganic Acid

Examples thereof include: phosphoric acid, tetrafluoroboric acid, perchloric acid, hexafluorophosphoric acid, hexafluoroantimonic acid, and hexafluoroarsenic acid, etc.

6) Others

Examples thereof include imide anion of trifluoromethane sulfonylimide or the like, and methide anion of trifluoromethane sulfonylmethide or the like.

Among them, 1) carboxylic acids (C11) having 1 to 15 carbon atoms, 3) monoalkyl phosphates having 1 to 15 carbon atoms, dialkyl phosphates having 2 to 30 carbon atoms and 5) inorganic acids (C2) are preferred, phthalic acid, maleic acid, mono- and di-ethyl phosphates, mono- and di-isopropyl phosphates, mono- and di-butyl phosphates, phosphoric acid, tetrafluoroboric acid, perchloric acid, hexafluorophosphoric acid, hexafluoroantimonic acid, and hexafluoroarsenic acid are more preferred, and phthalic acid and maleic acid are most preferred.

Examples of the electrolyte (D) include the followings: 1,2,3,4-tetramethylimidazolinium.phthalate anion, 1-ethyl-2,3-dimethylimidazolinium.phthalate anion, 1,2,3,4-tetramethylimidazolinium.maleate anion, 1-ethyl-2,3-dimethylimidazolinium.maleate anion, 1,2,3,4-tetramethylimidazolinium.phosphate anion, 1-ethyl-2,3-dimethylimidazolinium.phosphate anion, 1,2,3,4-tetramethylimidazolinium.diethylphosphate anion, 1-ethyl-2,3-dimethylimidazolinium.diethylphosphate anion, 1,2,3,4-tetramethylimidazolinium.diisopropylphosphate anion, 1-ethyl-2,3-dimethylimidazolinium.diisopropylphosphate anion, 1,2,3,4-tetramethylimidazolinium.dibutylphosphate anion, and 1-ethyl-2,3-dimethylimidazoinium.dibutylphosphate anion.

Among them, in view of electrochemical stability and so on, 1,2,3,4-tetramethylimidazolinium.phthalate anion, 1-ethyl-2,3-dimethylimidazolinium.phthalate anion, 1,2,3,4-tetramethylimidazolinium.maleate anion, and 1-ethyl-2,3-dimethylimidazolinium.maleate anion are preferred.

As methods for synthesizing the electrolyte (D), a method in which secondary and tertiary cyclic amidines are converted into quaternary form with alkyl halide, dialkyl sulfate or the like and subsequently anion-exchanged with organic acid salts of alkali metals or alkaline earth metals, a method in which quaternization is carried out with a carbonic acid diester to form a carbonate and the resultant is subject to anion exchange with an organic acid (JPH0867672A), a method in which an amide compound of a disubstituted diamine reacts with an organic acid (JPH11322720A), and so on are known.

The electrolytic solution for an aluminum electrolytic capacitor of the invention includes the electrolyte (D) as a main electrolyte. Herein, the expression of "includes . . . as a main electrolyte" means that the electrolyte (D) accounts for 50 wt % or more of the electrolyte contained in the electrolytic solution for an electrolytic capacitor of the invention.

The electrolytic solution for an aluminum electrolytic capacitor of the invention may also include, in addition to the electrolyte (D), an electrolyte (F). The content of (F) is less than 50 wt % of the electrolyte contained in the electrolytic solution for an electrolytic capacitor of the invention. Examples of the electrolyte (F) include quaternary ammonium salts. Specific examples thereof include triethylamine phthalate salt, ethyldimethylamine phthalate salt, diethylmethylamine phthalate salt, triethylamine maleate salt, ethyldimethylamine maleate salt, and diethylmethylamine maleate salt, etc.

<Compound (E)>

The compound (E) that constitutes the electrolytic solution of the invention includes the compound (E1) represented by the above general formula (2), the compound (E2) represented by the above general formula (3) and the compound (E3) represented by the above general formula (4), and specific examples thereof are described below. These compounds (E) may be used alone or in combination of two or more.

1) Compound (E1) Represented by General Formula (2)

Examples thereof include: N,N'-methylenebis(N-methylacetamide), 1,3-dimethyl-1,3-diazepane-4,7-dione, 1,3,5-trimethyl-1,3-diazepane-4,7-dione, N,N'-(ethane-1,2-diyl) bis(N-methylacetamide), 1,4-dimethyl-1,4-diazocane-5,8-dione, 1,2,4-trimethyl-1,4-diazocane-5,8-dione, and 1,4,6-trimethyl-1,4-diazocane-5,8-dione, etc.

2) Compound (E2) Represented by General Formula (3)

Examples thereof include: N,N-dimethyl-2-(N-methylacetamide)acetamide, 1,4-dimethyl-1,4-diazepane-2,5-dione, 1,4,6-trimethyl-1,4-diazepane-2,5-dione, 1,4,7-trimethyl-1,4-diazepane-2,5-dione, N,N-dimethyl-3-(N-methylacetamide)propanamide, 1,5-dimethyl-1,5-diazocane-2,6-dione, 1,3,5-trimethyl-1,5-diazocane-2,6-dione, and 1,4,5-trimethyl-1,5-diazocane-2,6-dione, etc.

3) Compound (E3) Represented by General Formula (4)

Examples thereof include: $N^1,N^1,N^3,N^3$-tetramethylmalonamide, 1,4-dimethyl-1,4-diazepane-5,7-dione, 1,2,4-trimethyl-1,4-diazepane-5,7-dione, and $N^1,N^1,N^4,N^4$-tetramethylsuccinamide, etc.

Among them, 1,3,5-trimethyl-1,3-diazepane-4,7-dione, 1,4,6-trimethyl-1,4-diazepane-2,5-dione, 1,4,7-trimethyl-1,4-diazepane-2,5-dione and 1,2,4-trimethyl-1,4-diazepane-5,7-dione are preferred.

The content of the compound (E), i.e., the total content of the compounds (E1), (E2) and (E3), is not more than 3 wt % relative to the total weight of the solvent (A) and the electrolyte (D). Further, the content is preferably 0.001 to 3 wt %, more preferably 0.005 to 2 wt %, even more preferably 0.01 to 1 wt %, and particularly preferably 0.01 to 0.5 wt %.

If the content exceeds 3 wt %, the electrical conductivity of the electrolytic solution of the invention is reduced.

The compound (E) may include the compound (E1), compound (E2) and the compound (E3), but it is also possible to use one of them alone, or two or more of them in combination.

The content of the compound (E) can be determined by high performance liquid chromatography (HPLC).

The HPLC measurement conditions include: a column filled with a polymer-coated filler, a phosphate buffer solution (pH is 2 to 3) as a mobile phase, a flow rate of 0.8 ml/min, a UV detector, and a temperature of 40° C. In addition, the electrolytic solution 100-fold diluted in the mobile phase serves as a sample for measurement.

Examples of methods for synthesizing the compound (E) include a method in which by-products and the solvent are distilled after two kinds of aminocarboxylic acid compounds are reacted in the solvent under reflux with heating, a method in which by-products and the solvent are distilled after a diamine compound and a dicarboxylic acid compound are reacted in the solvent under reflux with heating, and so on.

If needed, more water may be added to the electrolytic solution of the invention. In view of heat resistance, water is added in 10 wt % or less based on the weight of the electrolytic solution.

If needed, various additives commonly used for electrolytic solutions can be added to the electrolytic solution of the invention. Examples thereof include: phosphoric acid derivatives, such as phosphoric acid and phosphate esters, etc.; boric acid derivatives, such as boric acid, complexes of boric acid with polysaccharides (e.g., mannite and sorbit, etc.), and complexes of boric acid with polyhydric alcohols (e.g., ethylene glycol and glycerol, etc.), etc.; nitro compounds (e.g., o-nitrobenzoic acid, p-nitrobenzoic acid, m-nitrobenzoic acid, o-nitrophenol, and p-nitrophenol, etc.), etc. In view of electrical conductivity of the electrolyte (D) and its solubility in the solvent (A), the amount of the additive is not more than 10 wt % based on the weight of the electrolytic solution.

Examples of methods for producing the electrolytic solution for an aluminum electrolytic capacitor of the invention include a method in which the electrolyte (D) is added to the solvent (A) and stirred for homogenization, followed by adding thereto the compound (E) and stir-mixing the resultant.

EXAMPLES

Specific examples of the invention are described hereinafter, but the invention is not limited thereto. In the following, the term "part" refers to "part by weight."

Preparation Example 1

Ethyl acetate (0.1 mol) and 1,2-diaminopropane (0.1 mol) were prepared and maintained at a temperature of 140 to 180° C. and a pressure of 0 to 0.1 MPa for 6 hours, and an amidation reaction was conducted. Next, reduced-pressure distillation was conducted at a temperature of 110 to 150° C. to obtain 2,4-dimethylimidazoline. Next, the obtained 2,4-dimethylimidazoline (0.1 mol) was mixed with a methanol solution (74 wt %) of dimethyl carbonate (0.2 mol) and stirred at 120° C. for 15 hours to obtain a methanol solution of 1,2,3,4-tetramethylimidazolinium.methylcarbonate salt.

Phthalic acid (0.1 mol) was added to the methanol solution of 1,2,3,4-tetramethylimidazolinium.methylcarbonate salt (0.1 mol) to obtain a methanol solution of 1,2,3,4-tetramethylimidazolinium.phthalate anion. The resulting solution was heated under a reduced pressure of 1.0 kPa or less at 50° C. to distill methanol until no distillation of methanol was observed. Then, the temperature was raised from 50° C. to 100° C., and the heating was continued for 30 min to distill monomethyl carbonate (HOCO$_2$CH$_3$), methanol and carbon dioxide (small amounts of methanol and carbon dioxide are formed by thermal decomposition of monomethyl carbonate, which are hereinafter called by-products for short) to obtain 1,2,3,4-tetramethylimidazolinium.phthalate anion. The resulting 1,2,3,4-tetramethylimidazolinium.phthalate anion was recrystallized using methanol and isopropanol to obtain an electrolyte (D-1) {1,2,3,4-tetramethylimidazolinium.hthalate anion} from which impurities have been removed.

Preparation Example 2

Preparation was carried out in the same manner of Preparation Example 1 except that maleic acid (0.1 mol) was used in replacement of phthalic acid (0.1 mol), thereby obtaining an electrolyte (D-2) {1,2,3,4-tetramethylimidazolinium-.maleate anion}.

Preparation Example 3

Diethyl carbonate (0.1 mol) and 2-methylimidazoline (produced by Shikoku Chemicals Corporation; 0.1 mol) were prepared and stirred at a temperature of 100 to 150° C. for 10 hours to obtain 1-ethyl-2-methylimidazoline. Next, the obtained 1-ethyl-2-methylimidazoline (0.1 mol) was mixed with a methanol solution (74 wt %) of dimethyl carbonate (0.1 mol) and stirred at 120° C. for 15 hours to obtain a methanol solution of 1-ethyl-2,3-dimethylimidazolinium.methylcarbonate salt.

Phthalic acid (0.1 mol) was added to the obtained methanol solution of 1-ethyl-2,3-dimethylimidazolinium.methylcarbonate salt (0.1 mol) to obtain a methanol solution of 1-ethyl-2,3-dimethylimidazolinium.phthalate anion. The resulting solution was heated under a reduced pressure of 1.0 kPa or less at 50° C. to distill methanol until no distillation of methanol was observed. Then, the temperature was raised from 50° C. to 100° C., and the heating was continued for 30 min to distill monomethyl carbonate (HOCO$_2$CH$_3$) and the by-products to obtain 1-ethyl-2,3-dimethylimidazolinium.phthalate anion. The resulting 1-ethyl-2,3-dimethylimidazolinium.phthalate anion was recrystallized using methanol and isopropanol to obtain an electrolyte (D-3) {1-ethyl-2,3-dimethylimidazolinium.phthalate anion} from which impurities have been removed.

Preparation Example 4

Diethylamine (0.2 mol) was added to triethyl phosphate (0.1 mol), and the resultant was heated at 125° C. for 40 hours to prepare diethyl phosphate monoanion.diethylamine cation salt. The resultant was added to a methanol solution of 1,2,3,4-tetramethylimidazolinium.methylcarbonate salt (0.1 mol) for a salt exchange reaction to obtain a methanol solution of 1,2,3,4-tetramethylimidazolinium.diethyl phosphate monoanion. The resulting solution was heated under a reduced pressure of 1.0 kPa or less at 135° C. until no distillation of methanol or amines such as diethylamine was observed, thereby obtaining 1,2,3,4-tetramethylimidazolinium.diethyl phosphate monoanion. The resulting 1,2,3,4-tetramethylimidazolinium.diethyl phosphate monoanion was recrystallized using methanol and isopropanol to obtain an electrolyte (D-4) {1,2,3,4-tetramethylimidazolinium.diethyl phosphate monoanion} from which impurities have been removed.

Preparation Example 5

N-methyl aminoacetic acid (produced by Ark Pharm, Inc.) (0.1 mol), 2-methyl-3-(methylamino)propionic acid (produced by ChemBridge Corporation) (0.1 mol) and tetrahydrofuran (0.5 mol) were prepared in a four-necked vessel equipped with a cooling pipe, and reacted with each other under reflux with heating for 6 hours. After the reaction was conducted, water as the by-product and tetrahydrofuran were distilled under a reduced pressure of 1.0 kPa or less at 100° C., thereby obtaining 1,4,6-trimethyl-1,4-diazepane-2,5-dione (E2-1).

Preparation Example 6

Preparation was carried out by using N-methyl aminoacetic acid (produced by Ark Pharm, Inc.) (0.1 mol), 3-(methylamino)butanoic acid (produced by ChemBridge Corporation) (0.1 mol) and tetrahydrofuran (0.5 mol) in the same manner of Preparation Example 5, thereby obtaining 1,4,7-trimethyl-1,4-diazepane-2,5-dione (E2-2).

Preparation Example 7

Methylsuccinic acid (produced by Ark Pham, Inc.) (0.1 mol), methanediamine (produced by BOC Sciences) (0.1 mol) and tetrahydrofuran (0.5 mol) were prepared in a four-necked vessel equipped with a cooling pipe, and reacted with each other under reflux with heating for 6 hours. After the reaction was conducted, water as the by-product and tetrahydrofuran were distilled under a reduced pressure of 1.0 kPa or less at 100° C., thereby obtaining 5-methyl-1,3-diazepane-4,7-dione. Next, the obtained 5-methyl-1,3-diazepane-4,7-dione (0.1 mol) was mixed with a methanol solution (74 wt %) of dimethyl carbonate (0.2 mol) and stirred at 120° C. for 15 hours to obtain a methanol solution of 1,3,5-trimethyl-1,3-diazepane-4,7-dione. After that, methanol was distilled under a reduced pressure of 1.0 kPa or less at 100° C., thereby obtaining 1,3,5-trimethyl-1,3-diazepane-4,7-dione (E1-1).

Preparation Example 8

Preparation was carried out by using malonic acid (produced by Nacalai Tesque) (0.1 mol), N,N'-dimethyl-1,2-propanediamine (produced by starr Chemical) (0.1 mol) and tetrahydrofuran (0.5 mol) in the same manner of Preparation Example 5, thereby obtaining 1,2,4-trimethyl-1,4-diazepane-5,7-dione (E3-1).

<Preparation of Electrolytic Solution>

By mix-dissolving the electrolytes (D-1) to (D-4) obtained by Preparation Examples 1 to 4, the compounds (E1-1), (E2-1), (E2-2) and (E3-1) obtained by Preparation Examples 5 to 8, γ-butyrolactone (produced by Mitsubishi Chemical Corporation) and sulfolane (by Sumitomo Seika Chemicals Company, Limited) according to the blending amounts shown in Table 1, electrolytic solutions of Examples 1 to 36 and Comparative Examples 1 to 6 were prepared.

The content of the compound (E) is a value measured under the following measurement conditions, which is a value relative to the total weight of the solvent (A) and electrolyte (D).

Quantitative Determination of Compound (E)

The determination was performed under the following measurement conditions:
a machine being HPLC LC-10A made by Shimazdu Corporation, a CAPCELL PACK-type column UG120 (4.6 mmφ×25 cm) made by Shiseido Company, a mobile phase being an aqueous solution of phosphoric acid in a concentration of 10 mmol/l and sodium perchlorate in a concentration of 100 mmol/l, a flow rate of 0.8 ml/min, a detector of UV (210 nm) type, an injection volume of 20 μl, and a column temperature of 40° C. In addition, the electrolytic solution 100-fold diluted in the mobile phase served as a sample for measurement. A standard curve was created using the compound (E).

<Evaluation of Electrolytic Solution>

Liquid leakage, electrical conductivity and ratio of change in electrical conductivity with respect to the electrolytic solutions of Examples 1 to 36 of the invention and Comparative Examples 1 to 6 were measured and results thereof are shown in Tables 1 to 3.

Liquid Leakage

Winding-type aluminum electrolytic capacitors (rated voltage: 6.3 V; electrostatic capacity: 220 μF; size: ϕ56.5 mm×L4.5 mm) were produced using the electrolytic solutions. Peroxide-vulcanized butyl rubber was used as a sealing rubber. The rated voltage was applied to the produced capacitors, and after 3000 hours, the state of the sealing member was observed. The temperature and relative humidity conditions included the following three conditions: Condition A (105° C./85%), Condition B (130° C./85%) and Condition C (140° C./85%).

Electrical Conductivity

The electrical conductivity of the electrolytic solutions at 30° C. before a heat-resistance test was measured using an electrical conductivity meter CM-40S made by DKK-TOA Corporation.

Ratio of Change in Electrical Conductivity

After the heat-resistance test was carried out at 130° C. for 1000 hours in a sealed SUS (stainless steel) vessel, the ratio of change in electrical conductivity defined by the following equation was measured.

Ratio of change (%) in electrical conductivity=100×([electrical conductivity before the heat-resistance test]−[electrical conductivity after the heat-resistance test])/[electrical conductivity before the heat-resistance test]

TABLE 1

| | Blending amount of electrolytic solution | | | | | | | | | |
|---|---|---|---|---|---|---|---|---|---|---|
| | Solvent (A) | | | Electrolyte (D) | | | | Compound (E) | | |
| Electrolytic solution | Type | Type | Blending amount (part) | Type | Cation | Anion | Blending amount (part) | Type | Compound | Blending amount (part) |
| Example 1 | A-1 | γ-butyrolactone | 75 | D-1 | 1,2,3,4-tetramethyl-imidazolinium | Phthalate anion | 25 | E2-1 | 1,4,6-trimethyl-1,4-diazepane-2,5-dione | 0.01 |
| Example 2 | | Same as above | 75 | | Same as above | | 25 | E2-1 | Same as above | 0.02 |
| Example 3 | | Same as above | 75 | | Same as above | | 25 | E2-1 | Same as above | 0.05 |
| Example 4 | | Same as above | 75 | | Same as above | | 25 | E2-1 | Same as above | 1.20 |
| Example 5 | | Same as above | 75 | | Same as above | | 25 | E2-1 | Same as above | 2.95 |
| Example 6 | | Same as above | 75 | | Same as above | | 25 | — | — | 0 |
| Comparative Example 1 | | Same as above | 75 | | Same as above | | 25 | E2-1 | 1,4,6-trimethyl-1,4-diazepane-2,5-dione | 3.50 |
| Example 7 | A-1 | γ-butyrolactone | 75 | D-2 | 1,2,3,4-tetramethyl-imidazolinium | Maleate anion | 25 | E2-2 | 1,4,7-trimethyl-1,4-diazepane-2,5-dione | 0.01 |
| Example 8 | | Same as above | 75 | | Same as above | | 25 | E2-2 | Same as above | 0.02 |
| Example 9 | | Same as above | 75 | | Same as above | | 25 | E2-2 | Same as above | 0.10 |
| Example 10 | | Same as above | 75 | | Same as above | | 25 | E2-2 | Same as above | 1.50 |
| Example 11 | | Same as above | 75 | | Same as above | | 25 | E2-2 | Same as above | 2.90 |
| Example 12 | | Same as above | 75 | | Same as above | | 25 | — | — | 0 |
| Comparative Example 2 | | Same as above | 75 | | Same as above | | 25 | E2-2 | 1,4,7-trimethyl-1,4-diazepane-2,5-dione | 3.50 |

| | | Evaluation results | | | | |
|---|---|---|---|---|---|---|
| Electrolytic solution | Content of compound (E) (wt %) | State of sealing member | | | Electrical conductivity (mS/cm) | Ratio of change in electrical conductivity (%) |
| | | Condition A | Condition B | Condition C | | |
| Example 1 | 0.01 | Nothing abnormal | Nothing abnormal | One small leakage | 13.7 | 8.0 |
| Example 2 | 0.02 | Nothing abnormal | Nothing abnormal | One small leakage | 13.6 | 8.0 |
| Example 3 | 0.05 | Nothing abnormal | Nothing abnormal | One small leakage | 13.5 | 8.0 |
| Example 4 | 1.21 | Nothing abnormal | Nothing abnormal | One small leakage | 13.3 | 8.1 |
| Example 5 | 2.96 | Nothing abnormal | Nothing abnormal | One small leakage | 13.2 | 8.2 |
| Example 6 | 0 | Nothing abnormal | Nothing abnormal | Two small leakages | 13.7 | 8.0 |
| Comparative Example 1 | 3.51 | Nothing abnormal | Nothing abnormal | One small leakage | 12.0 | 15.1 |
| Example 7 | 0.01 | Nothing abnormal | Nothing abnormal | One small leakage | 17.0 | 8.1 |
| Example 8 | 0.02 | Nothing abnormal | Nothing abnormal | One small leakage | 16.9 | 8.1 |
| Example 9 | 0.11 | Nothing abnormal | Nothing abnormal | One small leakage | 16.7 | 8.2 |
| Example 10 | 1.49 | Nothing abnormal | Nothing abnormal | One small leakage | 16.6 | 8.2 |

TABLE 1-continued

| | | | | | | |
|---|---|---|---|---|---|---|
| Example 11 | 2.89 | Nothing abnormal | Nothing abnormal | One small leakage | 16.5 | 8.3 |
| Example 12 | 0 | Nothing abnormal | Nothing abnormal | Two small leakages | 17.0 | 8.1 |
| Comparative Example 2 | 3.52 | Nothing abnormal | Nothing abnormal | One small leakage | 15.0 | 15.3 |

TABLE 2

Blending amount of electrolytic solution

| | Solvent (A) | | | Electrolyte (D) | | | | Compound (E) | | |
|---|---|---|---|---|---|---|---|---|---|---|
| Electrolytic solution | Type | Type | Blending amount (part) | Type | Cation | Anion | Blending amount (part) | Type | Compound | Blending amount (part) |
| Example 13 | A-1 | γ-butyrolactone | 75 | D-3 | 1-ethyl-2,3-dimethyl-imidazolinium | Phthalate anion | 25 | E1-1 | 1,3,5-trimethyl-1,3-diazepane-4,7-dione | 0.01 |
| Example 14 | | Same as above | 75 | | Same as above | | 25 | E1-1 | Same as above | 0.03 |
| Example 15 | | Same as above | 75 | | Same as above | | 25 | E1-1 | Same as above | 0.14 |
| Example 16 | | Same as above | 75 | | Same as above | | 25 | E1-1 | Same as above | 1.60 |
| Example 17 | | Same as above | 75 | | Same as above | | 25 | E1-1 | Same as above | 2.98 |
| Example 18 | | Same as above | 75 | | Same as above | | 25 | — | — | 0 |
| Comparative Example 3 | | Same as above | 75 | | Same as above | | 25 | E1-1 | 1,3,5-trimethyl-1,3-diazepane-4,7-dione | 3.50 |
| Example 19 | A-1 | γ-butyrolactone | 75 | D-4 | 1,2,3,4-tetramethyl-imidazolinium | Diethyl phosphate monoanion | 25 | E3-1 | 1,2,4-trimethyl-1,4-diazepane-5,7-dione | 0.01 |
| Example 20 | | Same as above | 75 | | Same as above | | 25 | E3-1 | Same as above | 0.04 |
| Example 21 | | Same as above | 75 | | Same as above | | 25 | E3-1 | Same as above | 0.21 |
| Example 22 | | Same as above | 75 | | Same as above | | 25 | E3-1 | Same as above | 1.80 |
| Example 23 | | Same as above | 75 | | Same as above | | 25 | E3-1 | Same as above | 2.99 |
| Example 24 | | Same as above | 75 | | Same as above | | 25 | — | — | 0 |
| Comparative Example 4 | | Same as above | 75 | | Same as above | | 25 | E3-1 | 1,2,4-trimethyl-1,4-diazepane-5,7-dione | 3.50 |

| | | Evaluation results | | | | |
|---|---|---|---|---|---|---|
| Electrolytic solution | Content of compound (E) (wt %) | State of sealing member | | | Electrical conductivity (mS/cm) | Ratio of change in electrical conductivity (%) |
| | | Condition A | Condition B | Condition C | | |
| Example 13 | 0.01 | Nothing abnormal | Nothing abnormal | One small leakage | 12.5 | 7.8 |
| Example 14 | 0.03 | Nothing abnormal | Nothing abnormal | One small leakage | 12.5 | 7.9 |
| Example 15 | 0.15 | Nothing abnormal | Nothing abnormal | One small leakage | 12.4 | 8.0 |
| Example 16 | 1.61 | Nothing abnormal | Nothing abnormal | One small leakage | 12.3 | 8.5 |
| Example 17 | 2.99 | Nothing abnormal | Nothing abnormal | One small leakage | 12.2 | 8.9 |
| Example 18 | 0 | Nothing abnormal | Nothing abnormal | Two small leakages | 12.5 | 7.8 |
| Comparative Example 3 | 3.51 | Nothing abnormal | Nothing abnormal | One small leakage | 11.2 | 13.1 |
| Example 19 | 0.01 | Nothing abnormal | Nothing abnormal | One small leakage | 10.0 | 8.2 |
| Example 20 | 0.04 | Nothing abnormal | Nothing abnormal | One small leakage | 9.9 | 8.2 |
| Example 21 | 0.21 | Nothing abnormal | Nothing abnormal | One small leakage | 9.8 | 8.3 |
| Example 22 | 1.81 | Nothing abnormal | Nothing abnormal | One small leakage | 9.6 | 8.6 |
| Example 23 | 2.99 | Nothing abnormal | Nothing abnormal | One small leakage | 9.5 | 8.8 |
| Example 24 | 0 | Nothing abnormal | Nothing abnormal | Two small leakages | 10.0 | 8.2 |
| Comparative Example 4 | 3.49 | Nothing abnormal | Nothing abnormal | One small leakage | 8.4 | 13.9 |

TABLE 3

Blending amount of electrolytic solution

| | Solvent (A) | | | Electrolyte (D) | | | | Compound (E) | | |
|---|---|---|---|---|---|---|---|---|---|---|
| Electrolytic solution | Type | Type | Blending amount (part) | Type | Cation | Anion | Blending amount (Part) | Type | Compound | Blending amount (part) |
| Example 25 | A-2 | Sulfolane | 75 | D-1 | 1,2,3,4-tetramethyl-imidazolinium | Phthalate anion | 25 | E2-1 | 1,4,6-trimethyl-1,4-diazepane-2,5-dione | 0.01 |
| Example 26 | | Same as above | 75 | | Same as above | | 25 | E2-1 | Same as above | 0.03 |
| Example 27 | | Same as above | 75 | | Same as above | | 25 | E2-1 | Same as above | 0.11 |

TABLE 3-continued

| | | | | | | | | | |
|---|---|---|---|---|---|---|---|---|---|
| Example 28 | Same as above | 75 | | Same as above | | 25 | E2-1 | Same as above | 1.25 |
| Example 29 | Same as above | 75 | | Same as above | | 25 | E2-1 | Same as above | 2.85 |
| Example 30 | Same as above | 75 | | Same as above | | 25 | — | — | 0 |
| Comparative Example 5 | Same as above | 75 | | Same as above | | 25 | E2-1 | 1,4,6-trimethyl-1,4-diazepane-2,5-dione | 3.50 |
| Example 31 | A-1 γ-butyrolactone | 75 | D-1 | 1,2,3,4-tetramethyl-imidazolinium | Phthalate anion | 25 | E2-1, E2-2 | Mixture of 1,4,6-trimethyl-1,4-diazepane-2,5-dione and 1,4,7-trimethyl-1,4-diazepane-2,5-dione (mixing ratio: 1:1 wt ratio) | 0.01 |
| Example 32 | Same as above | 75 | | Same as above | | 25 | E2-1, E2-2 | Same as above | 0.021 |
| Example 33 | Same as above | 75 | | Same as above | | 25 | E2-1, E2-2 | Same as above | 0.06 |
| Example 34 | Same as above | 75 | | Same as above | | 25 | E2-1, E2-2 | Same as above | 1.33 |
| Example 35 | Same as above | 75 | | Same as above | | 25 | E2-1, E2-2 | Same as above | 2.75 |
| Example 36 | Same as above | 75 | | Same as above | | 25 | — | — | 0.00 |
| Comparative Example 6 | Same as above | 75 | | Same as above | | 25 | E2-1, E2-2 | Mixture of 1,4,6-trimethyl-1,4-diazepane-2,5-dione and 1,4,7-trimethyl-1,4-diazepane-2,5-dione (mixing ratio: 1:1 wt ratio) | 3.50 |

| | | Evaluation results | | | | |
|---|---|---|---|---|---|---|
| Electrolytic solution | Content of compound (E) (wt %) | State of sealing member | | | Electrical conductivity (mS/cm) | Ratio of change in electrical conductivity (%) |
| | | Condition A | Condition B | Condition C | | |
| Example 25 | 0.01 | Nothing abnormal | Nothing abnormal | One small leakage | 3.3 | 7.8 |
| Example 26 | 0.03 | Nothing abnormal | Nothing abnormal | One small leakage | 3.3 | 7.8 |
| Example 27 | 0.11 | Nothing abnormal | Nothing abnormal | One small leakage | 3.2 | 8.0 |
| Example 28 | 1.26 | Nothing abnormal | Nothing abnormal | One small leakage | 3.2 | 8.3 |
| Example 29 | 2.86 | Nothing abnormal | Nothing abnormal | One small leakage | 3.1 | 8.8 |
| Example 30 | 0 | Nothing abnormal | Nothing abnormal | Two small leakages | 3.3 | 7.8 |
| Comparative Example 5 | 3.48 | Nothing abnormal | Nothing abnormal | One small leakage | 2.0 | 13.5 |
| Example 31 | 0.01 | Nothing abnormal | Nothing abnormal | One small leakage | 13.7 | 8.0 |
| Example 32 | 0.021 | Nothing abnormal | Nothing abnormal | One small leakage | 13.6 | 8.0 |
| Example 33 | 0.06 | Nothing abnormal | Nothing abnormal | One small leakage | 13.5 | 8.1 |
| Example 34 | 1.34 | Nothing abnormal | Nothing abnormal | One small leakage | 13.3 | 8.3 |
| Example 35 | 2.76 | Nothing abnormal | Nothing abnormal | One small leakage | 13.2 | 8.9 |
| Example 36 | 0.00 | Nothing abnormal | Nothing abnormal | Two small leakages | 13.7 | 8.0 |
| Comparative Example 6 | 3.49 | Nothing abnormal | Nothing abnormal | One small leakage | 12.0 | 13.7 |

Through comparisons respectively between Examples 1 to 6 and Comparative Example 1, between Examples 7 to 12 and Comparative Example 2, between Examples 13 to 18 and Comparative Example 3, between Examples 19 to 24 and Comparative Example 4, between Examples 25 to 30 and Comparative Example 5, and between Examples 31 to 36 and Comparative Example 6, it is clear that with regard to liquid leakage, the Examples and the Comparative Examples have almost the same high level of liquid leakage; with regard to electrical conductivity and ratio of change in electrical conductivity, the Examples are excellent in both respects.

INDUSTRIAL APPLICABILITY

By using the electrolytic solution of the invention, leakage of the electrolytic solution from a sealed part does not occur even at a higher environment temperature or in a high-humidity condition, thereby enhancing the reliability of the electrolytic capacitor. The electrolytic solution of the invention is particularly useful in automotive applications in which the environment easily reaches a high temperature and high humidity.

What is claimed is:

1. An electrolytic solution for an aluminum electrolytic capacitor, comprising: a solvent (A); and an electrolyte (D) represented by general formula (1), wherein a total content of a compound (E1) represented by general formula (2), a compound (E2) represented by general formula (3) and a compound (E3) represented by general formula (4) is not more than 3 wt % relative to a total weight of (A) and (D), wherein

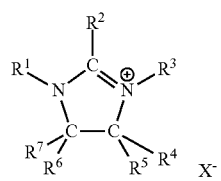

(1)

in formula (1), $R^1$ to $R^3$ each represent alkyl having 1 to 3 carbon atoms, $R^4$ to $R^7$ each represent alkyl having 1 to 3 carbon atoms or a hydrogen atom, and $X^-$ represents an anion of an acid (C), wherein the acid (C) is an organic acid, and the organic acid is at least one selected from the group consisting of a carboxylic acid (C11) having 1 to 15 carbon atoms, a monoalkyl phosphate having 1 to 15 carbon atoms, and a dialkyl phosphate having 2 to 30 carbon atoms,

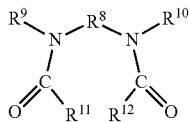

(2)

in formula (2), $R^8$ is alkylene having 1 to 3 carbon atoms, $R^9$ to $R^{12}$ are each alkyl having 1 to 3 carbon atoms or a hydrogen atom, and $R^{11}$ and $R^{12}$ may be covalently bonded to form a ring,

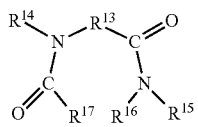

(3)

in formula (3), $R^{13}$ is alkylene having 1 to 3 carbon atoms, $R^{14}$ to $R^{17}$ are each alkyl having 1 to 3 carbon atoms or a hydrogen atom, and $R^{16}$ and $R^{17}$ may be covalently bonded to form a ring, and

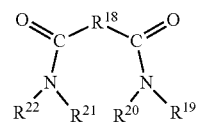

(4)

in formula (4), $R^{18}$ is alkylene having 1 to 3 carbon atoms, $R^{19}$ to $R^{22}$ are each alkyl having 1 to 3 carbon atoms or a hydrogen atom, and $R^{20}$ and $R^{21}$ may be covalently bonded to form a ring.

2. The electrolytic solution of claim 1, wherein the solvent (A) is a polar solvent (A1).

3. The electrolytic solution of claim 2, wherein the polar solvent (A1) has dielectric constant of 5 to 150 at 25° C.

4. The electrolytic solution of claim 2, wherein the polar solvent (A1) is an aprotic solvent (A11).

5. The electrolytic solution of claim 4, wherein the aprotic solvent (A11) is at least one selected from the group consisting of ether, amide, lactone, nitrile, carbonate and sulfone.

6. The electrolytic solution of claim 1, wherein the carboxylic acid (C11) comprise phthalic acid and/or maleic acid.

7. The electrolytic solution for an aluminum electrolytic capacitor of claim 1, wherein the total content of the compounds (E1), (E2) and (E3) is 0.001 to 3 wt % relative to the total weight of (A) and (D).

8. An aluminum electrolytic capacitor comprising the electrolytic solution of claim 1.

* * * * *